US012574262B2

(12) United States Patent
Das et al.

(10) Patent No.: US 12,574,262 B2
(45) Date of Patent: Mar. 10, 2026

(54) CONFIDENTIAL VIRTUAL MACHINE USING STATE-SEPERATED STORAGE ARCHITECTURE

(71) Applicant: Microsoft Technology Licensing, LLC, Redmond, WA (US)

(72) Inventors: Rajsekhar Das, Sammamish, WA (US); Shaheed Chagani, Redmond, WA (US); Hakki Tunc Bostanci, Redmond, WA (US); Vinod R. Shankar, Redmond, WA (US); Narayanan Parthasarathy, Redmond, WA (US); Pushkar V. Chitnis, Bothell, WA (US); Ahmad Abdullateef, Duvall, WA (US); Matthaus A. Wesemann, Redmond, WA (US); Arun U. Kishan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 18/590,626

(22) Filed: Feb. 28, 2024

(65) Prior Publication Data

US 2025/0274297 A1 Aug. 28, 2025

(51) Int. Cl.
*H04L 9/00* (2022.01)
*G06F 9/4401* (2018.01)
(52) U.S. Cl.
CPC .............. *H04L 9/50* (2022.05); *G06F 9/4401* (2013.01)
(58) Field of Classification Search
CPC .................... H04L 9/50; G06F 9/4401; G06F 2009/45587; G06F 21/57
See application file for complete search history.

(56) References Cited

U.S. PATENT DOCUMENTS

| | | | |
|---|---|---|---|
| 2019/0205540 A1* | 7/2019 | Campagna | ............. G06F 21/57 |
| 2022/0198021 A1* | 6/2022 | Subramanian | ...... G06F 21/6227 |
| 2022/0413883 A1 | 12/2022 | Clebsch et al. | |
| 2024/0072995 A1* | 2/2024 | Tsirkin | ................ G06F 13/4027 |

OTHER PUBLICATIONS

Extended European search report received in European Application No. 25154082.9, mailed on Jun. 20, 2025, 7 pages.
Weinhold, et al., "jVPFS: Adding Robustness to a Secure Stacked File System with Untrusted Local Storage Components", USENIX, The Advanced Computing Systems Association, May 2, 2011, pp. 1-14.

* cited by examiner

*Primary Examiner* — Mohamed A. Wasel

(57) ABSTRACT

Examples of the present disclosure describe systems and methods for implementing a confidential virtual machine generation system. In examples, read-only and read-write volumes are generated to store operating system binaries and user-generated content, respectively, on filesystems indexed using hash trees. The hash values of the roots of the two hash trees are stored in a location accessed as part of loading an operating system. The example system accesses the roots of the two hash trees to access the current state of read-only and read-write volumes and verify the states using a checksum. The verified states are merged to generate an operating system image associated image with the confidential virtual machine. Additionally, the system merges the namespaces of filesystems of read-only and read-write volumes into a single filesystem namespace concealing multiple volumes.

20 Claims, 8 Drawing Sheets

COMPUTING DEVICE 102

VIRTUAL MACHINE MANAGER 110

UPDATE SESSION ORCHESTRATOR 112

SERVICING STACK 114

105

UPDATE SERVER 108

104

106

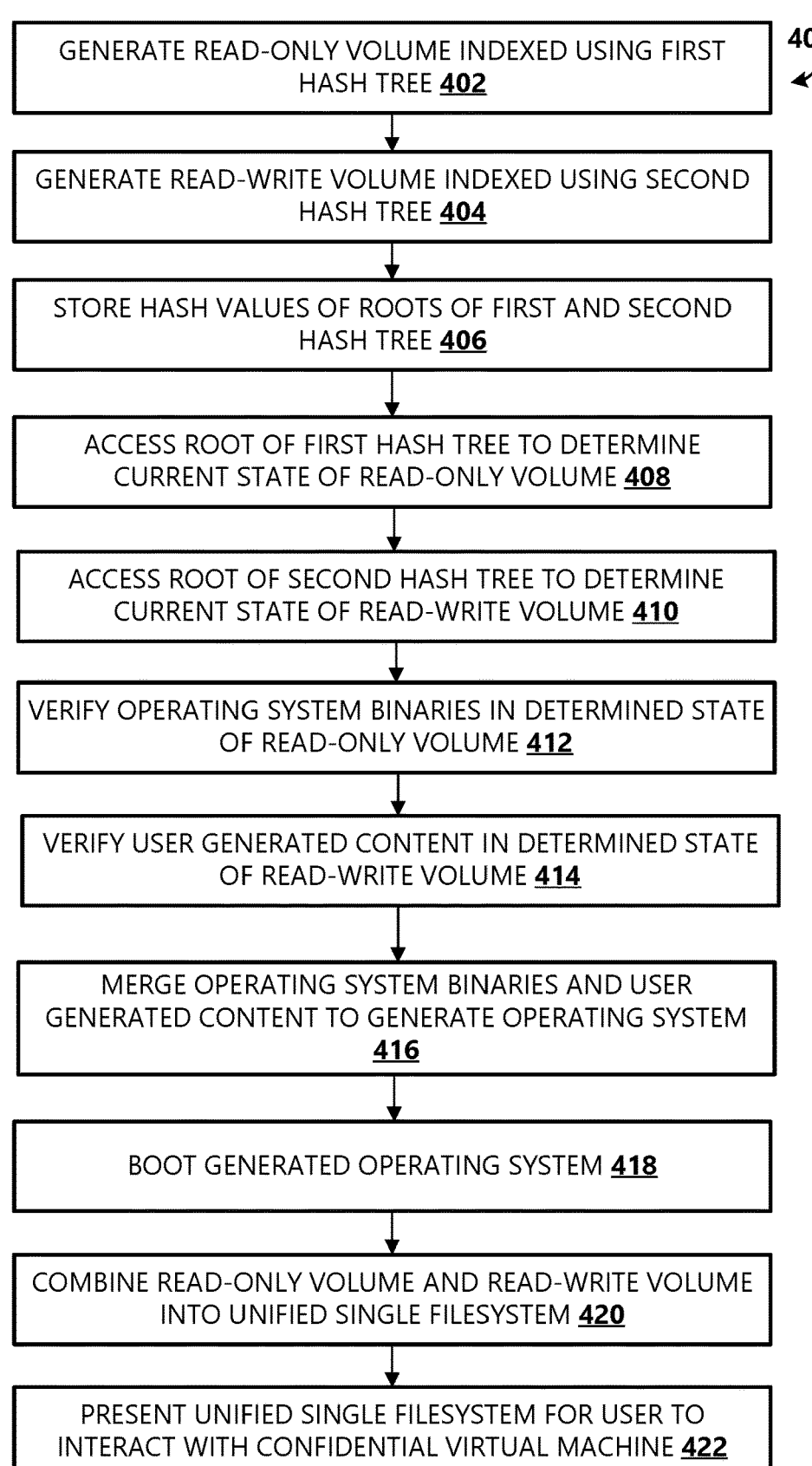

400

GENERATE READ-ONLY VOLUME INDEXED USING FIRST HASH TREE 402

GENERATE READ-WRITE VOLUME INDEXED USING SECOND HASH TREE 404

STORE HASH VALUES OF ROOTS OF FIRST AND SECOND HASH TREE 406

ACCESS ROOT OF FIRST HASH TREE TO DETERMINE CURRENT STATE OF READ-ONLY VOLUME 408

ACCESS ROOT OF SECOND HASH TREE TO DETERMINE CURRENT STATE OF READ-WRITE VOLUME 410

VERIFY OPERATING SYSTEM BINARIES IN DETERMINED STATE OF READ-ONLY VOLUME 412

VERIFY USER GENERATED CONTENT IN DETERMINED STATE OF READ-WRITE VOLUME 414

MERGE OPERATING SYSTEM BINARIES AND USER GENERATED CONTENT TO GENERATE OPERATING SYSTEM 416

BOOT GENERATED OPERATING SYSTEM 418

COMBINE READ-ONLY VOLUME AND READ-WRITE VOLUME INTO UNIFIED SINGLE FILESYSTEM 420

PRESENT UNIFIED SINGLE FILESYSTEM FOR USER TO INTERACT WITH CONFIDENTIAL VIRTUAL MACHINE 422

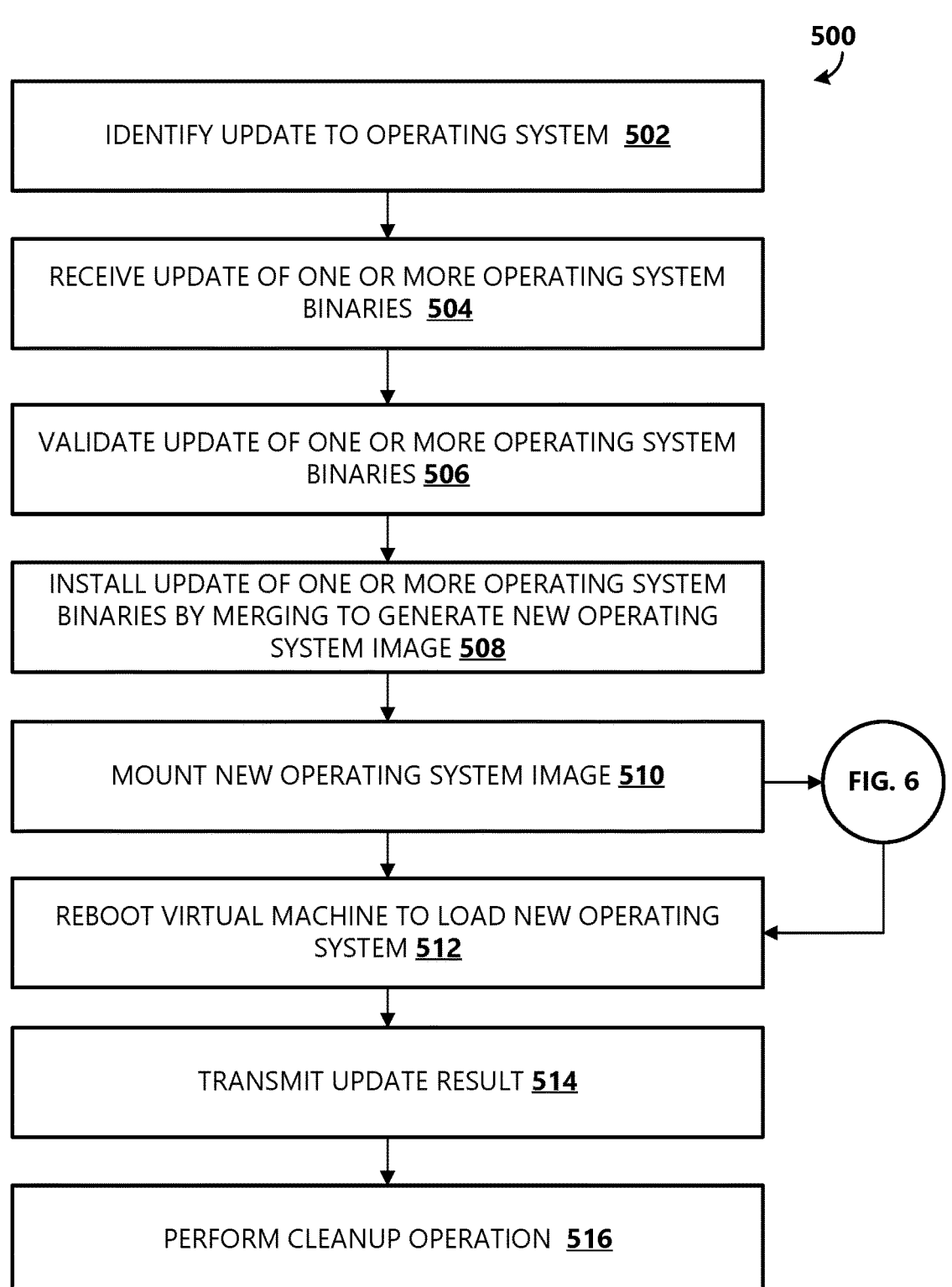

IDENTIFY UPDATE TO OPERATING SYSTEM  502

RECEIVE UPDATE OF ONE OR MORE OPERATING SYSTEM BINARIES  504

VALIDATE UPDATE OF ONE OR MORE OPERATING SYSTEM BINARIES  506

INSTALL UPDATE OF ONE OR MORE OPERATING SYSTEM BINARIES BY MERGING TO GENERATE NEW OPERATING SYSTEM IMAGE  508

MOUNT NEW OPERATING SYSTEM IMAGE  510

FIG. 6

REBOOT VIRTUAL MACHINE TO LOAD NEW OPERATING SYSTEM  512

TRANSMIT UPDATE RESULT  514

PERFORM CLEANUP OPERATION  516

FIG. 5

CONFIDENTIAL VIRTUAL MACHINE USING STATE-SEPERATED STORAGE ARCHITECTURE

BACKGROUND

Traditional confidential virtual machines are specialized virtual machines that provide a secure environment to execute operations on a platform hosting the confidential virtual machine. The host of a confidential virtual machine is provided limited access or no access to its secure environment. Accordingly, the domain of trust remains within the guest, i.e., the virtual machine, and does not extend to the host, i.e., a computing device or a cloud platform hosting the virtual machine. The boundary of trust of a confidential virtual machine is restricted to its secure environment. This limits any data used and changed in the volatile memory of a secure environment from leaving the boundary of trust and still being regarded as trusted data to use in the future. Thus, no data or other information representing the state of a confidential virtual machine can be persisted outside the boundary of trust for future use by a confidential virtual machine. As a result, challenges exist in persisting the state of a virtual machine between virtual machine sessions. Any changes to a confidential virtual machine across cannot exist and a new confidential virtual machine needs to be instantiated representing the changed state.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

The present disclosure includes a virtual machine manager used to set up and instantiate a confidential virtual machine, with data managed beyond the boundary of trust of the secure computing environment. The confidential virtual machine is set up by first generating a read-only volume and a read-write volume formatted using a filesystem indexed using hash trees. The read-only volume stores operating system binaries and the read-write volume stores user-generated content. As part of the setup, the read-only and read-write volumes are mounted, which allows access to their contents at a particular location. The process of mounting results in a path to the files in the volume. As the final step of the setup, the disclosed system stores the hash values of roots of the hash tree indexing filesystems of read-only and read-write memory. The hash values are stored in a location that is used as part of loading an operating system.

The system follows setup with instantiation of the confidential virtual machine. The confidential virtual machine instantiation includes accessing the stored roots of the hash tree to determine the current states of the read-only and read-write volume. The system next verifies the determined states of the read-only and read-write volumes by comparing a checksum associated with the determined states with the checksum computed based on the contents (i.e., operating system binaries and other software) associated with the determined current state of read-only and read-write volumes. Upon successful verification, the disclosed system merges the operating system binaries and the user-generated content obtained based on the state of the read-only and read-write volumes to generate an image of an operating system associated with a confidential virtual machine. The system then merges the namespaces of the read-only and read-write volumes into a unified single filesystem namespace. The setup confidential virtual machine is booted to load the merged image of the operating system. The instantiated confidential virtual machine is presented to a user who sees a single filesystem hiding the multiple volumes storing the state of a confidential virtual machine.

Examples of the present disclosure describe systems and methods for implementing a confidential virtual machine with state-separated architectures where the state is stored on volumes outside of the boundary of trust. The ability to load the state into a confidential virtual machine allows state persistence and usage between sessions. The disclosed system and methods use a Merkle hash tree implemented in a filesystem to maintain and validate the chain of trust, which proves that the loaded state is from a trusted source and thus maintains a secure environment.

The disclosed system and methods further allow for separation of state by making the contents associated with a Merkle chain read-only. Any changes made to the Merkel chain are then written to a different Merkle chain with read-write capability but attached to the same root of trust, which represents the trusted source, for example, a certification authority.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following Figures.

FIG. 4 depicts an example method for setting up a confidential virtual machine with state separation.

FIG. 5 depicts an example method for updating a state-separated confidential virtual machine.

DETAILED DESCRIPTION

Figure 1:
FIG. 1 illustrates an example system for implementing a state-separated confidential virtual machine.

Confidential virtual machines provide a secure computing environment to execute operations on a platform hosting the confidential virtual machine ("host"). Ideally, the host provides limited or no access to the data and operations of the secure computing environment. Accordingly, the secure environment represents a domain of trust for the confidential virtual machine. A domain of trust refers to a domain (e.g., a computing environment) that is perceived by an entity (e.g., a confidential virtual machine) as trustworthy. While a confidential virtual machine is active or engaged in an active session (e.g., is running), the runtime state of the confidential virtual machine is maintained and/or stored by the confidential virtual machine. The runtime state ("state") represents the current execution state of a component and may include pending calls sent to or received from software and hardware components, currently executing processes or operations, pointers to memory addresses, and the like.

Confidential virtual machines currently provide a secure environment for encrypting and persisting data within memory to restrict outside actors, including the host of the confidential virtual machine. So, when the confidential virtual machine is inactive or no longer engaged in an active session (e.g., a confidential virtual machine is hibernated or put to sleep to make it inactive or a confidential virtual machine is powered down and no longer engaged in an active session), the confidential virtual machine is no longer able to maintain and/or store its state. To persist the state of a confidential virtual machine across confidential virtual machine sessions, the host can be permitted to store the state. However, enabling the host to store the state poses a risk to the domain of trust for the confidential virtual machine. As such, prior to ingesting the state when the confidential virtual machine resumes activity (e.g., starts or resumes a session), the confidential virtual machine must verify that the state has not been tampered with and remains valid. Furthermore, persisting in memory limits changes to a confidential virtual machine's configuration during its operation. For example, to update a software in a confidential virtual machine, a new confidential virtual machine needs to be generated to provide a secure environment to execution the updated software.

Disclosed herein are embodiments of a confidential virtual machine that allow a confidential virtual machines state to be protected beyond its boundary of trust, i.e., secure environment. In order to expand the boundary of trust beyond the secure environment of a confidential virtual machine it needs to have the ability to verify the integrity of the persisted state. As part of verifying persisted state, it should be able to identify any changes to the persisted state by an external agent. Also, when such a change is identified, a confidential virtual machine needs to have an ability to quarantine the identified change.

The present disclosure provides a solution that enables implementing a confidential virtual machine with state-separated architectures to allow state persistence and usage between sessions. The disclosed system and methods use a Merkle chain implemented in a filesystem to maintain and validate the chain of trust and maintain a secure environment. The disclosed system further expands the idea to allow for separation of state by making the contents associated with a Merkle chain read-only. Any changes made to the Merkel chain are written to a different Merkle chain that has read-write capability and is attached to the same root of trust. This approach enables confidential virtual machines to be provisioned for various update pipelines while offering the security features of a traditional confidential virtual machine.

In order to have a confidential virtual machine whose host cannot interfere, a confidential virtual machine needs to have a way to maintain data integrity and replayability. Additionally, for any user generated content saved outside of the confidential virtual machine boundaries, there is a need for data confidentiality.

Figure 8:
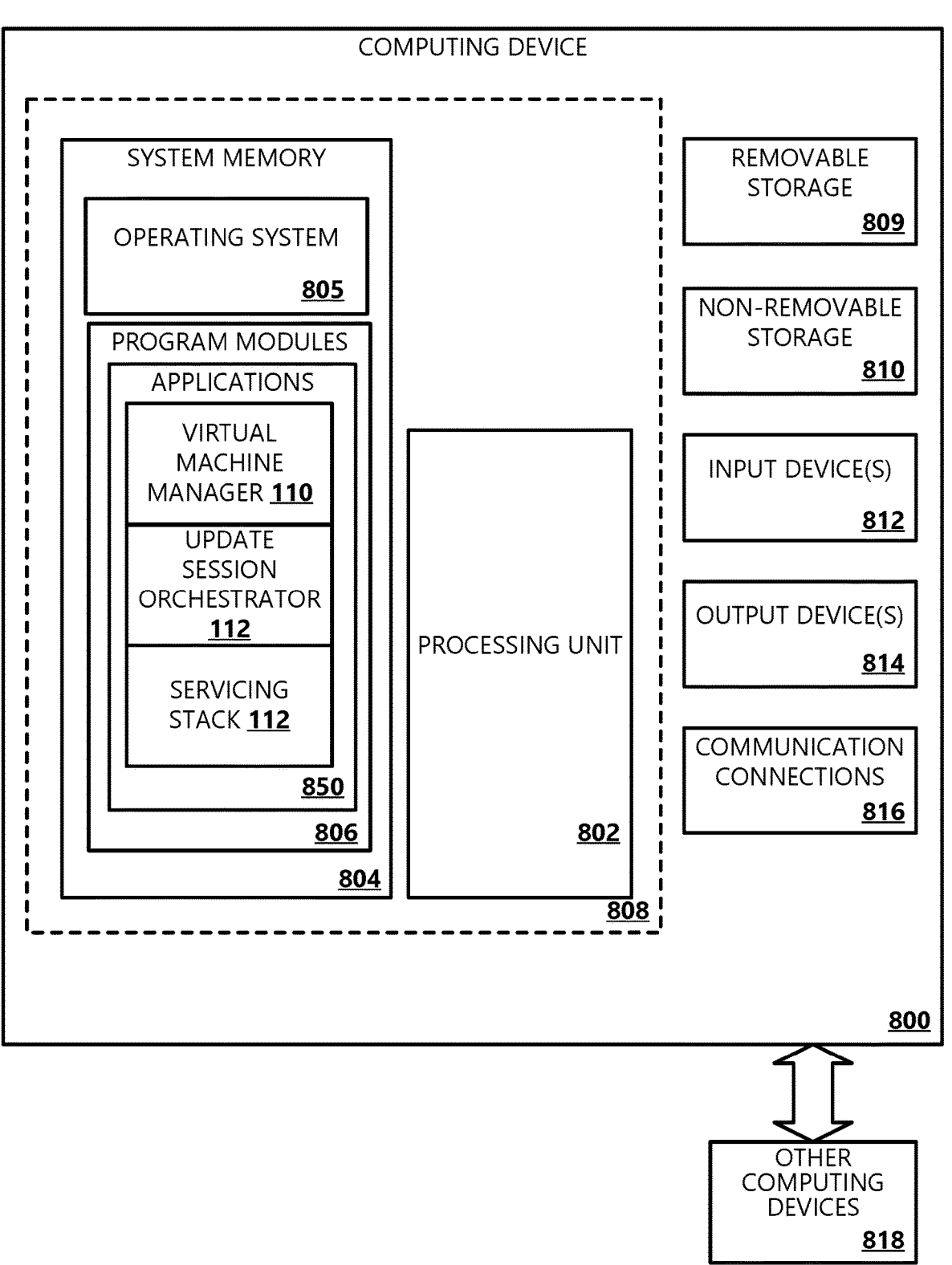
FIG. 8 is a block diagram illustrating example physical components of a computing device for practicing aspects of the disclosure.

FIG. 1 illustrates an example system for implementing a state-separated confidential virtual machine. The example system 100, as depicted, is a combination of interdependent components that interact to form an integrated whole. Some components of system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 8. In another example, the components of systems disclosed herein are distributed across multiple processing devices.

The example system 100 generates a confidential virtual machine to be hosted on a computing device. A confidential virtual machine is a specialized virtual machine that is secured from access by its host (e.g., computing device 102). As illustrated in FIG. 1, system 100 includes update server 108 to help generate and manage confidential virtual machine(s) and computing device 102 to host the generated confidential virtual machine(s). In another example, computing device 102 collaborates with update server 108 to generate and manage a confidential virtual machine across multiple sessions. In some examples, computing device 102 and update server 108 together represent a computing device. In some other examples, update server 108 hosts a confidential virtual machine requested by computing device 102.

In an example implementation, computing device 102 includes a plurality of applications for performing different tasks, such as generating virtual machines, securing and updating virtual machine software, etc. In FIG. 1, the applications include at least one virtual machine manager 110 that operates to allow users to request the generation of confidential virtual machines. Virtual machine manager 110 may have one or more application user interfaces (UIs) 106 by which a user can generate requests for generating confidential virtual machines managed by update session orchestrator 112 and servicing stack 114. For example, an application UI 106 may be presented on display screen 104. In some examples, the operating environment is a multi-application environment by which a user may view and interact with virtual machine manager 110 through multiple application UIs 106. In some examples, update session orchestrator 112 and servicing stack 114 may be part of virtual machine manager 110.

In an example implementation, virtual machine manager 110 generates a confidential virtual machine managed by update session orchestrator 112 and servicing stack 114. Update session orchestrator 112 checks for any updates to the generated confidential virtual machine and requests servicing stack 114 to apply any available updates. Servicing stack 114 helps install the updates identified and downloaded by update session orchestrator 112. These and other examples are described below in further detail with reference to FIGS. 2-7.

Update session orchestrator 112 is an operating system component that orchestrates the sequence of downloading and installing various update types listed by update server 108. Various types of updates identified by update session orchestrator 112 include, operating system feature updates, operating system security updates, and drivers.

Upon downloading the various updates, update session orchestrator 112 requests servicing stack 114 to assist with installation of the updates. In some examples, update session orchestrator 112 verifies the downloaded updates before installation and after installation. Update session orchestrator 112 includes an API and provides a unified interface for various installers applying updates to software on a confidential virtual machine. In some examples, update session orchestrator 112 runs in the background constantly monitoring for updates.

Servicing stack 114 installs updates by selecting the operating system to boot into to apply the updates. For example, servicing stack 114 configures a confidential virtual machine to boot into a small operating system to apply updates which require updates to the filesystem layout of a confidential virtual machine. Servicing stack 114 reviews the installed updates to determine if any of the updates need to be rolled back (e.g., removed). In some examples, servicing stack 114 rolls back operating system updates on failure to install other software. Servicing stack 114 works with update session orchestrator 112 to install the updates downloaded by updates session orchestrator 112. In examples, servicing stack 114 handles a portion of installation of updates, such as device drivers or software that changes the layout of the filesystem of a confidential virtual machine. In other examples, servicing stack 114 reviews the installations performed by update session orchestrator 112.

Update server 108 provides operating system updates to update session orchestrator 112. Update session orchestrator 112 may periodically query update server 108 for updates to software running on a confidential virtual machine. When update server 108 confirms the availability of software updates, update session orchestrator 112 downloads the updates to install from update server 108. Updates session orchestrator 112 may select one or more updates to download for a confidential virtual machine from a list of available updates. In example implementations, update server 108 operates on a device located remotely from the computing device 102. For instance, the computing device 102 may communicate with update server 108 using one or a combination of networks 105 (e.g., a private area network (PAN), a local area network (LAN), and a wide area network (WAN)). In some examples, update server 108 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

Figure 2:
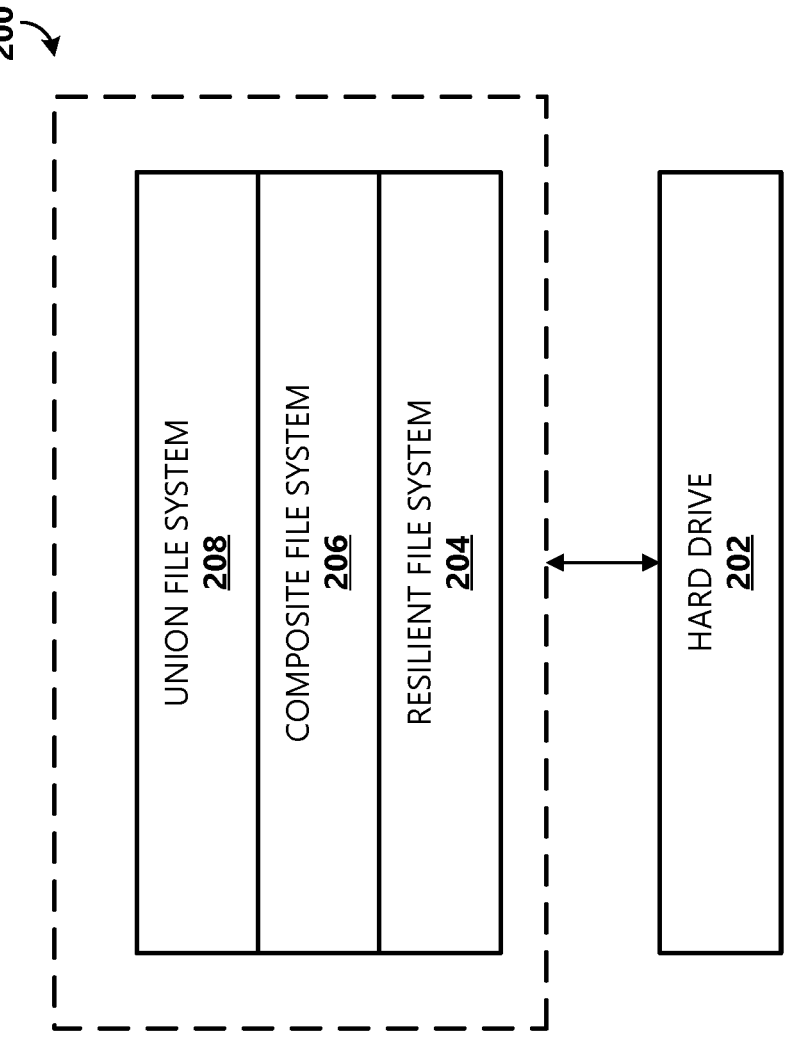
FIG. 2 is a block diagram of a filesystem stack for setting up a state-separated confidential virtual machine.

FIG. 2 is a block diagram of a filesystem stack for setting up a state-separated confidential virtual machine.

Filesystem stack 200 uses a combination of multiple filesystems to offer a state-separated confidential virtual machine that cannot be interfered with by its host (e.g., computing device 102 of FIG. 1). Filesystems 204-208 secure the confidential virtual machine from access beyond its boundaries and presents the virtual machine to the end user similar to traditional virtual machines. As illustrated in FIG. 2, filesystem stack 200 includes resilient filesystem 204, composite filesystem 206, and union filesystem 208. The filesystems 204-208 run on top of a physical hard drive 202. In some examples, hard drive 202 includes multiple hard drives of different technologies. For example, hard drive 202 may include a magnetic or solid-state drive. In some other examples, hard drive 202 is a virtual hard drive specific to a confidential virtual machine using filesystem stack 200.

The state of a virtual machine includes changes performed on a virtual machine. For example, installing and uninstalling software on a virtual machine running the Microsoft® Windows® operating system can result in an update to a set of registry keys representing the virtual machine's state. Resilient filesystem 204 secures this state by using a hash-based tree where each tree node can represent various software components installed and uninstalled at different points in time.

Resilient filesystem 204 of the filesystem stack 200 is used for boot and read-only OS volumes. Resilient filesystem 204 uses a Merkle hash tree with check summing logic to provide integrity of metadata and data of a read-only volume or boot volume. A volume using resilient filesystem 204 is uniquely identified by a globally unique identifier (GUID) generated during the formatting of that volume. Resilient filesystem 204 is also used with volumes with read-write capabilities to store the updated state of a read-only volume of a confidential virtual machine. A monotonically increasing virtual clock is used to identify the state of a read-write volume at a point in time. For example, a read-write volume formatted using resilient filesystem 204 is identified at a point-in-time by the combination of GUID of the volume, and a virtual clock time value when GUID was stored to log checkpoint of state of the read-write volume. The GUID and virtual clock time value combination forms a checkpoint record of a read-write volume and is included as the metadata.

A confidential virtual machine disclosed herein includes multiple volumes. Multiple volumes include read-only and read-write volumes representing the initial state and an updated state of a confidential virtual machine. The state of a confidential virtual machine includes an operating system, other software, and drivers currently installed and used by a confidential virtual machine. Any update to software on a confidential virtual machine representing an updated state is written to a read-write volume formatted using resilient filesystem 204. The updated state is recorded using the Merkle hash tree of resilient filesystem 204. The hash value of a node in the Merkle hash tree points to a confidential virtual machine's state at a point-in-time. Alternate hash tree data structures such as Verkle hash trees, and Tiger hash trees may be used to store hash values. The hash trees can be implemented as a binary tree, ternary tree, or n-ary tree. The state is stored on a hard drive (e.g., hard drive 202) separate from the secure environment of a confidential virtual machine. This state-separation from a confidential virtual machine allows it to load a particular version of the operating system and other software saved using the Merkle hash tree of resilient filesystem 204.

Composite filesystem 206 handles different read-only and read-write volumes formatted using resilient filesystem 204. Composite filesystem 206 stores image fragments of an operating system, and other software images called composite images (CIMs) that can be merged to form a merged image. Composite filesystem 206 is used to write a merged CIM formed using updated operating system binaries to a read-write volume. A merged CIM may represent the state of a confidential virtual machine at a point-in-time. In some examples, a new version of merged CIM is created and mounted on a read-only volume instead of merging updated CIMs in a read-write volume with the base set of CIMs in a read-only volume. The state representing a new version of CIM on a read-only volume is recorded in the Merkle tree of resilient filesystem 204 associated with a read-only volume.

Union filesystem 208 provides a unified single filesystem interface of various volumes with different filesystems. Accordingly, union filesystem 208 conceals the multiple volumes (read-only and read-write) used for state separation architecture in a confidential virtual machine from a user of the confidential virtual machine by presenting a unified single filesystem.

Union filesystem 208 supports the resilient filesystem 204 on multiple volumes by virtualizing the style of file identifiers of content in resilient filesystem 204. For example, a user sees uniform file paths which are transformed by union filesystem 208 to specific file paths representing file identifiers of content in resilient filesystem 204 associated with multiple read-only and read-write volumes.

Union filesystem 208 supports file operations on a read-only volume formatted using resilient filesystem 204 without triggering file copy. For example, a file operation to set a hardlink on a file on a read-only volume is simulated using a softlink, thereby avoiding a copy or any other write operation on a read-only volume. A hardlink refers to an actual file identifier pointing to a file on a physical media (e.g., hard drive 202). A softlink refers to a link pointing to a hardlink or to another softlink which may point to a hardlink associated with a file.

Other file operations may include setting attributes of files and folders and access control lists of those files and folders. Union filesystem 208 allows data write file operation by preparing and transmitting a copy of a file in read-only volume to read-write volume, both formatted using resilient filesystem 204.

In some examples, union filesystem 208 ensures a read-write volume formatted with resilient filesystem 204 is used as a scratch volume that is deleted when any updates written to a read-write volume is finalized and incorporated into a read-only volume associated with a confidential virtual machine. For example, an update to a CIM image fragment of an operating system causes the union filesystem to make a copy of the CIM to the read-write volume and apply the update. Subsequently, a new version of the CIM image of an operating system is created. The new version of the CIM image is mounted to the read-only volume and the updated CIM image fragment and the read-write volume including the CIM image fragment are ignored or deleted.

Filesystem stack 200 provides data integrity of read-only and read-write volumes using in-built integrity provided by resilient filesystem 204's Merkle check summing logic stored in a Merkle hash tree.

Volumes formatted using resilient filesystem 204 achieve replayability by providing the GUID of a volume and the time of a virtual clock time value as a checkpoint record. A confidential virtual machine can achieve replayability by selecting a previous checkpoint record to revert to a previous state. For example, when a software update fails, a confidential virtual machine can revert to a previous state using a checkpoint record.

A checkpoint record containing GUID and virtual clock time value is encrypted and stored in a cryptographic hash in a basic input/output system (BIOS) location to load a particular operating system version and other software on a confidential virtual machine. The location of storage of a checkpoint record may vary with different volumes. For example, the boot volume may store the checkpoint record of GUID and virtual clock time value in a Unified Extensible Firmware Interface (UEFI), which is validated during the boot-up of a confidential virtual machine. In another example, the read-only OS volume may store a cryptographic hash of the volume's checkpoint record in a Virtual Trusted Platform Module (VTPM). A read-only volume checkpoint record is signed with a cryptographic hash of a guest key of a confidential virtual machine or a trusted root certificate.

Resilient filesystem 204 also provides data protection of data on volumes formatted using resilient filesystem 204 and stored beyond the boundaries of a confidential virtual machine. For example, a confidential virtual machine may store data updated by a user action, such as a software update installation in a read-write volume, by encrypting the data using a software encryption technique (e.g., BitLocker® or VeraCrypt®) to provide data protection and confidentiality. The encrypted data is persisted between multiple sessions of a confidential virtual machine.

Resilient filesystem 204 also has a mechanism to avoid an impersonation attack. An impersonation attack is an attack vector in which a new volume is created to mimic an existing read-only volume by applying metadata of the existing read-only volume (e.g., the GUID and the virtual clock time value) to the new volume. The checksums for the new volume are then recomputed based on the applied metadata, which enables the checksums of the new volume to match the checksums of the existing read-only volume. The mechanism to avoid an impersonation attack is achieved in a read-only (or read-write) volume by storing the cryptographic hash of a resilient filesystem formatted volume checkpoint record in a VTPM. For example, to generate a tampered volume intended to impersonate a valid (e.g., untampered) read-only volume, the metadata of the tampered volume is changed with the GUID and virtual clock time value of the untampered volume. However, the cryptographic hash associated with the Merkle checksums for the untampered volume will be different from the cryptographic hash associated with the Merkle checksums for the tampered volume.

Figure 3:
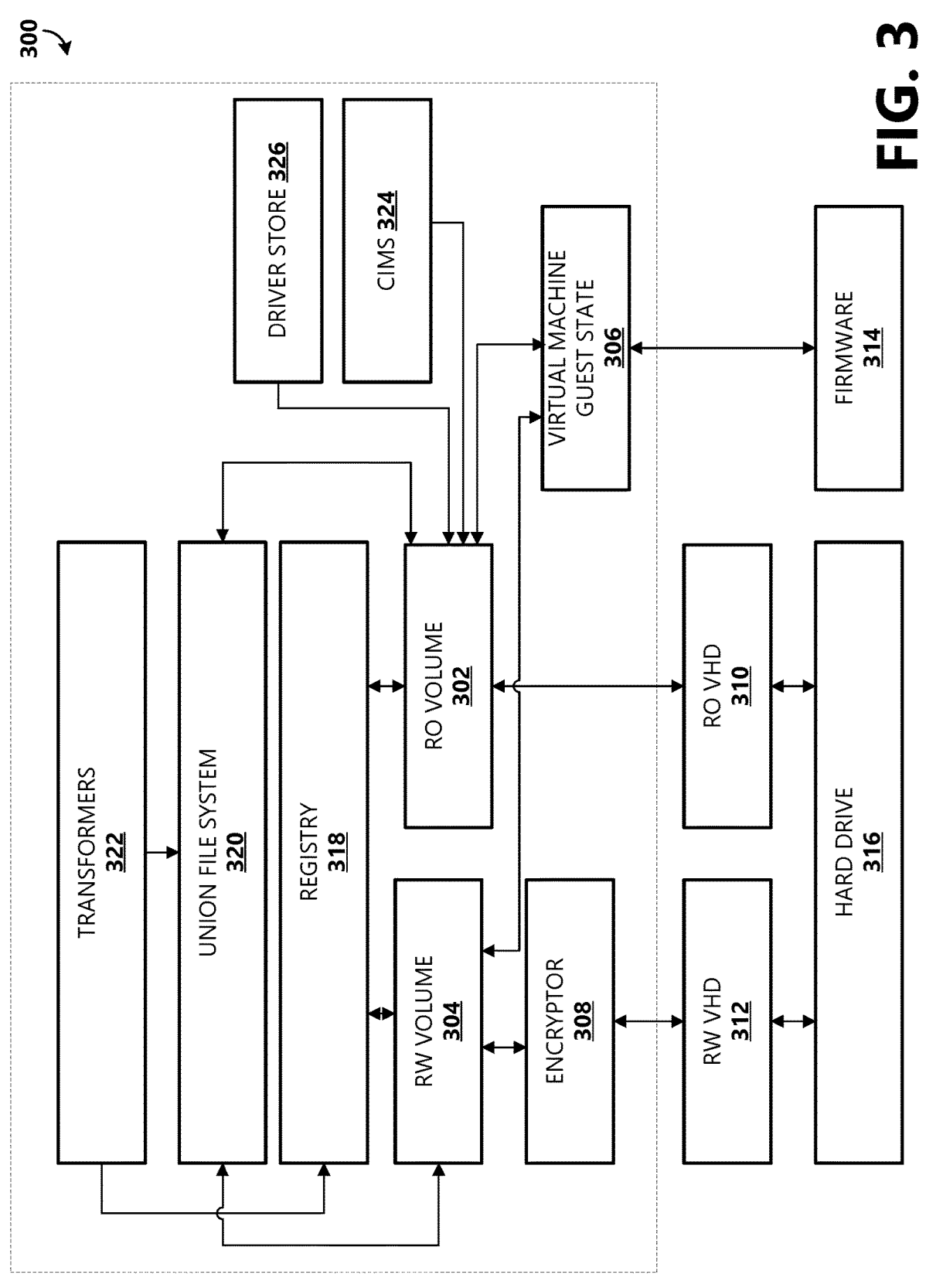
FIG. 3 illustrates an example of software components of a confidential virtual machine.

FIG. 3 illustrates an example of software components of a confidential virtual machine. As illustrated in FIG. 3, confidential virtual machine 300 includes read-only (RO) volume 302 to prevent a host of confidential virtual machine 300 from making any changes to the contents of confidential virtual machine 300. As illustrated in FIG. 3, confidential virtual machine 300 also includes read-write (RW) volume 304 to allow saving changes to the state of confidential virtual machine 300.

RO volume 302 and RW volume 304 are formatted using resilient filesystem 204 (as shown in FIG. 2) to allow for managing the state of confidential virtual machine 300. RW volume 304 persist changes to confidential virtual machine 300's state beyond the current session of confidential virtual machine 300. Persisted states are used to restore previously created versions of confidential virtual machine 300, including any changes to its software and other data. In examples, resilient filesystem 204 maintains information about the state of RO volume 302 and RW volume 304 using a hash tree with each node representing the state of confidential virtual machine 300, including various installed and uninstalled software and software updates. The host of confidential virtual machine 300, for example, system 100 (of FIG. 1), stores information about the hash tree in virtual machine guest state (VMGS) 306. In some examples, VMGS 306 includes the root of the hash tree used to manage the confidential virtual machine 300's state. In some examples, system 100 stores state information of RO volume 302 and RW volume 304 separately. For example, system 100 running confidential virtual machine 300 stores state information for RO volume 302 in a UEFI and state information for RW volume 304 in a VTPM, as described in FIG. 2 above.

As illustrated in FIG. 3, RO volume 302 and RW volume 304 are implemented on top of read-only virtual hard drive (RO VHD) 310 and read-write virtual hard drive (RW VHD) 312. VMGS 306 is a virtual hard drive similar to RO VHD 310 and RW VHD 312. VMGS 306 virtualizes firmware 314. VMGS 306 stores states of unified extensible firmware interface (UEFI) and virtual trusted platform module (VTPM).

Resilient filesystem 204 (as shown in FIG. 2) in RO volume 302 computes the cryptographic hash of a checkpoint record, either with a guest key or a trusted root certificate. The computed hash is stored in the VTPM of VMGS 306. When RO volume 302 is mounted, resilient filesystem 204 validates the computed hash to prevent rollback and impersonation attacks.

Resilient filesystem 204 in RW volume 304 stores the volume's GUID and a virtual clock time value in the UEFI of VMGS 306. The stored value is updated regularly, forming checkpoints. For example, resilient filesystem 204 checkpoints once every 5 seconds by default, or more frequently if there is high metadata activity to checkpoint changes to contents of RW volume 304. When RW volume 304 is mounted as part of booting confidential virtual machine 300, resilient filesystem 204 checks the virtual clock time value of RW volume 304 to prevent any unrequested rollbacks.

Confidential virtual machine 300 protects the state saved outside its boundaries using encryptor 308. Encryptor 308 encrypts data persisted between multiple sessions of confidential virtual machine 300 and protects against rollback and/or impersonation of RO Volume 302. Encryptor 308 achieves this protection by storing the cryptographic hash of RO volume 302's checkpoint record as part of BitLocker metadata on the RW volume 304.

Registry 318 stores key-value pairs of metadata representing various software installed on confidential virtual machine 300. The data in the registry 318 represents the state of confidential virtual machine 300. For example, registry 318 may be a hierarchical database that stores registry keys comprising settings such as a software program's installation location, a software program's version, or instructions for running a software program. The settings may be stored as key-value pairs, such as "HKEY_CURRENT_USER\Environment\TEMP," where "HKEY_CURRENT_USER\Environment" is the key portion of the pair and "TEMP" is the value portion of the pair.

As illustrated in FIG. 3, registry 318 is overlaid on both RO volume 302 and RW volume 304 and provides a unified view of multiple registries that separately store the state of confidential virtual machine 300. Registry 318 includes a read-only registry storing the default settings required for the operating system binaries forming the operating system running on confidential virtual machine 300. Confidential virtual machine 300 stores changed registry entries in the read-write registry in registry 318. A registry entry change can result from a user's intent or the installation/uninstallation of software. System 100 overlays the read-only and read-write registries of RO volume 302 and RW volume 304 as a unified view registry 318 when confidential virtual machine 300 is booted up. Overlaying the read-only and read-write registries of RO volume 302 and RW volume 304 comprises copying the registry values of RO volume 302 and RW volume 304 to a common view. In some examples, the registry values of RO volume 302 and RW volume 304 are separately listed within the common view. For instance, a first section or version of the common view may comprise the registry values for RO volume 302 and a second section or version of the common view may comprise the registry values for RW volume 304. In other examples, the registry values of RO volume 302 and RW volume 304 are listed together within the common view. For instance, for each registry key, the corresponding registry value of RO volume 302 may be listed in a delimited manner (e.g., comma-delimited or line break delimited) proximate to (e.g., beside or under) the corresponding registry value of RW volume 304.

In examples, changes to entry settings of registry 318 result in copying a registry entry to the read-write registry in registry 318. An entry copied to the read-write registry in registry 318 causes the original version of the entry in the read-only memory to no longer be visible to the user. For instance, when a user accesses registry 318, the entries copied to the read-write registry are displayed and the corresponding entries in the read-only memory are suppressed from view to ensure that the most recently updated entry is provided to the user. Confidential virtual machine 300 avoids such scenarios by locking down registry 318 to prevent unnecessary security changes.

While confidential virtual machine 300 uses multiple volumes (e.g., RO volume 302 and RW volume 304) to present a state-separated architecture, it does not reveal these details to its user. Confidential virtual machine 300 presents multiple filesystems used to format RO volume 302 and RW volume 304 as a unified filesystem using union filesystem 320. Union filesystem 320 is the equivalent of union filesystem 208 (of FIG. 2) and has the same capabilities.

Union filesystem 320 in this architecture merges respective operating system images on RO volume 302 and RW volume 304 into a single filesystem namespace. A namespace is a logical grouping of unique identifiers or symbols (e.g., names) for the data objects in RO volume 302 and RW volume 304. The identifiers or symbols defined for a namespace are only associated with that namespace and enable the data objects in RO volume 302 and RW volume 304 to be easily identified. Union filesystem 320 presents the individual namespaces in RO volume 302 and RW volume 304 with individual style file identifiers as uniform identifiers of a single filesystem namespace.

All software components and applications placed above the filesystem stack 200 (as shown in FIG. 2) are provided a view of the composed filesystem image. Union filesystem 208 is the user-visible filesystem for all components on confidential virtual machine 300.

Transformers 322 are software plugins that cause moving, copying, deleting, or performing any other change of union filesystem 320 and data in registry 318. Transformers 322 performs changes to accommodate layout changes to the directories and files upon an update to software. For example, RW volume 304, including user changes to an operating system in RO volume 302, relies on the file layout in RO volume 302, and an operating system upgrade that changes the file layout results in a need to update the user changes in RW volume 304 to match the updated file layout. In examples, a transformer 322 is a plugin servicing stack 114 (as shown in FIG. 1). In some examples, transformers 322 also provides a storage location to backup data that can be used for rollback or uninstall of software and updates to the operating system running on confidential virtual machine 300. In some examples, transformers 322 are operable to run while confidential virtual machine 300 is active. In other examples, transformers 322 are operable to run while confidential virtual machine 300 is inactive. For instance, a secondary update operating system may be booted to perform the transformation prior to booting the primary operating system of confidential virtual machine 300.

Transformers 322 support updates to schema/layout for mutable data generated by the operating system running on confidential virtual machine 300. In some examples, mutable data representing the state of the operating system is stored in a data store, such as registry 318. Servicing stack 114 (as shown in FIG. 1) runs transformer 322 to perform the transformation of the layout/schema of a filesystem (e.g., resilient filesystem 204, union filesystem 320) to apply state changes from software updates, including operating system updates in confidential virtual machine 300. Transformers 322 reboots confidential virtual machine 300 to load a new version of the operating system and apply the changes to the layout/schema of the filesystem.

CIMS 324 consists of partial images of software and operating system running on confidential virtual machine 300. An operating system running on confidential virtual machine 300 is formed from multiple image fragments in CIMS 324 stored in RO volume 302.

Based on the configuration of confidential virtual machine 300, one or more image fragments in CIMS 324 are merged at boot time to construct a merged CIM that describes the desired image to run on confidential virtual machine 300. CIMS 324 is formed using composite filesystem 206 (as shown in FIG. 2). By allowing the merging of image fragments to form various configurations of operating systems, composite filesystem 206 provides high-performance composability. CIMS 324, using composite filesystem 206, resides in RO volume 302 formatted using resilient filesystem 204. Accordingly, CIMS 324 has the guarantee of integrity protection from the mechanisms provided by resilient filesystem 204 described in FIG. 2 above.

During a servicing event, such as an update, a new volume of resilient filesystem 204 is generated in confidential virtual machine 300 with the updated packages stored as CIMS 324. Servicing stack 114 (as shown in FIG. 1) configures the boot command entries to merge the new CIMs with the original base CIM. Boot command entries are the calls to perform during starting an operating system on a physical machine/ virtual machine. If the servicing event is a full feature update, a new merged CIM is formed from the CIMS 324. When confidential virtual machine 300 is rebooted, the new merged CIM is generated, and the system boots up from it.

Unlike applications, software drivers in driver store 326 are attached as a file subsystem of the union filesystem 320. By being part of a file subsystem under the union filesystem 320, software drivers in driver store 326 are not visible to a user of confidential virtual machine 300. Driver store 326 is a trusted collection of first and third-party drivers underneath the union filesystem 320. Union filesystem 320 provides a unified view of the first-party and third-party drivers present in the driver store 326.

First-party drivers support offline staging in confidential virtual machine 300, requiring confidential virtual machine 300 to boot to load the drivers as part of an updated operating system running on confidential virtual machine 300. This helps prevent the state of a driver from mutating on its first usage. RO volume 302 stores the initial collection of first-party driver packages from driver store 326. Confidential virtual machine 300's user may install additional drivers whose metadata is stored in RW volume 304.

Having described a system that may be employed by the aspects disclosed herein, this disclosure will now describe methods that may be performed by various aspects of the disclosure. In aspects, methods 400-700 may be executed by a system, such as system 100 of FIG. 1. For instance, a computing device (such as server or cloud computing device) may include at least one processor and memory storing instructions that, when executed, cause the operations of methods 400-700 to be performed. However, methods 400-700 are not limited to such examples.

FIG. 4 depicts an example method 400 for setting up a confidential virtual machine with state separation.

At operation 402, a read-only volume (e.g., RO volume 302 of FIG. 3) is generated to use in a confidential virtual machine (e.g., confidential virtual machine 300 of FIG. 3). The read-only volume prevents a host (e.g., computing device 102 of FIG. 1) of a confidential virtual machine from tampering with the contents of the read-only volume. System 100 (as shown in FIG. 1) may generate read-only volume to use in a confidential virtual machine.

In some examples, the read-only volume may be a formatted portion of a hard drive (e.g., hard drive 316 of FIG. 3) or a virtual hard drive (e.g., RO VHD 310 of FIG. 3). The generation of the read-only volume may include mounting the formatted portion to form a volume of the root volume, where the operating system and other applications reside. In some examples, the root volume forms the main volume under which other volumes are mounted and accessed through the root volume. For example, an operating system image to load into a confidential virtual machine is mounted under the root volume.

In some examples, the read-only volume is indexed using a hash tree to keep track of the state of the read-only volume. For example, the read-only volume may be formatted using a resilient filesystem (e.g., Resilient filesystem 204 of FIG. 2), which is indexed using a Merkle hash tree. The Merkle tree stores a hash value representing data associated with the read-only volume, such as content within directories and files of the read-only volume and metadata (e.g., a GUID or a virtual clock) of the read-only volume. In some examples, the data represents the current state of an operating system and/or other applications present in the read-only volume. Additional nodes may be added to or removed from a Merkle hash tree when there is a change in the state of the operating system present in the read-only volume.

In some examples, generating a read-only volume includes populating it with binaries of operating system software used as part of a confidential virtual machine boot-up. Operating system binaries may be portions of operating systems (e.g., CIMS 324 of FIG. 3) that may be merged to form an operating system image mounted on the generated read-only volume.

At operation 404, a read-write volume (e.g., RW volume 304 of FIG. 3) is generated to use in a confidential virtual machine. Read-write volume hosts portions of the operating system updated by a user and any other user-generated content. In some examples, the data stored in read-write volume includes metadata about the software installed/ uninstalled on a confidential virtual machine. For example, data in a read-write volume may be registry keys in a registry (e.g., registry 318 of FIG. 3) of installed software present in a read-write volume. In some examples, the read-write volume is stored beyond the bounds of a confidential virtual machine on a separate portion of a hard drive or a virtual hard drive (e.g., RW VHD 312 of FIG. 3).

Like operation 402, at operation 404, the read-write volume is indexed using a second hash tree different from the one used in operation 402. For example, the read-only volume may be formatted using a resilient filesystem (e.g., Resilient filesystem 204 of FIG. 2), which is indexed using a Merkle hash tree. In contrast, the read-write volume may be indexed using a second Merkle hash tree, where each node of the second hash tree includes a cryptographic hash representing user data or user-updated software present on the read-write volume. Unlike the read-only volume, operation 404 may encrypt the contents of the read-write volume. For example, the read-write volume may be encrypted using encryption software such as Encryptor 308 (as shown in FIG. 3).

In some examples, generating a read-write volume includes populating it with binaries of operating system software and other software used as part of a confidential virtual machine boot-up. Operating system binaries may be portions of operating systems that may be merged to form an operating system image mounted to load the operating system. The operating system binaries and other software present in read-write volume are copies of operating system binaries and software present in read-only volume. The copies in read-write volume are the latest updated versions and override the copies in the read-only volume.

At operation 406, values of roots of the first and second hash trees generated in operations 402 and 404 are stored. The root of the first hash tree used to index the read-only volume in operation 402 is stored for access by the confidential virtual machines at boot time. For example, the root of the first hash tree is stored in the unified extensible firmware interface (UEFI) representing the BIOS used for booting a confidential virtual machine. Specifically, the root of the first hash tree may be stored in the secured boot section of the UEFI in order to enable the confidential virtual machine to trust the operating system in the read-only volume accessed using the stored hash value. In examples, the roots of the first and second hash trees include a hash value mapped to the initial state of read-only and read-write volumes. Additional nodes are added to the tree forming a chain of changes to the state of read-only and read-write volumes.

Similar to the root of the first hash tree, the root of the second hash tree used to index read-write volume in operation 404 is stored for access by the confidential virtual machine at boot time. For example, the root of the second hash tree is stored in the firmware portion, such as the Trusted platform or Virtual Trusted Platform Module. In some examples, the root of the second hash tree is also stored in UEFI.

At operation 408, the root of the first hash tree is accessed to determine the current state of the read-only volume from UEFI. The current state of the read-only volume may include information about the software (e.g., software version, install date, permitted uses or users) installed/uninstalled on the read-only volume. A hash value stored in UEFI is accessed to find the mapped operating system binaries that are part of the latest version of the operating system to run on a confidential virtual machine. The mapped operating system binaries form the state of read-only volume at the current point in time. The hash value is obtained from the Merkle hash tree indexing read-only volume.

At operation 410, the root of the second hash tree is accessed to determine the current state of the read-write volume from VTPM. A hash value stored in VTPM is accessed to find the mapped user-generated content that is the latest version of read-write memory contents. The mapped content forms the current state of read-write volume. In some examples, read-write memory is empty during the instantiation of a confidential virtual machine. The hash value is obtained from the Merkle hash tree indexing read-only volume.

At operation 412, operating system binaries in the determined state of read-only volume in operation 408 are verified using the checksum that is part of the Merkle hash tree indexing the read-only volume. The operating system binaries are verified to confirm their integrity. This helps maintain trust of data that moves beyond the secure environment of a confidential virtual machine.

At operation 414, user-generated content in the determined state of the read-write volume in operation 410 is verified using the checksum that is part of the Merkle hash tree indexing the read-write volume. Similar to operation 412, this helps confirm integrity of data accessed from read-write volume that is stored beyond the boundary of trust of a confidential virtual machine.

At operation 416, operating system binaries and user-generated content are merged to generate an operating system image used in a confidential virtual machine. Operating system binaries stored in the read-only and read-write volumes are merged to generate an operating system image. Contents of the read-only and read-write volumes are merged by copying the contents (e.g., software and settings) of the read-only and read-write volumes to the same operating system image such that content of the read-only volume is overwritten with changes to the corresponding content of the read-write volume in the operating system image. For example, an old version of software that is installed in a read-only volume may be updated to a new version of the software in the read-write volume. Merging the contents of the read-only and read-write volumes may also include adding any user-generated content of the read-write volume to the contents of read-only volume in the operating system image. In examples, the generated operating system image is mounted as part of operation 408 for access during boot-up of a confidential virtual machine.

At operation 418, an operating system image generated in operation 416 is used to boot a confidential virtual machine. For example, confidential virtual machine 300 (as shown in FIG. 3) accesses the mounted operating system image from operation 416 during boot-up.

At operation 420, the read-only volume and the read-write volume generated in operations 402 and 404 are merged to be presented as a single filesystem (e.g., union filesystem 320 of FIG. 3). Read-only and read-write volumes are merged to present to a user a single filesystem similar to traditional virtual machines. Presenting a single filesystem provides a transparent user experience to the user by preventing the underlying technology of the confidential virtual machine from being exposed to the user. After successfully booting up a confidential virtual machine and presenting a unified single filesystem, an operating system or other software running on a confidential virtual machine may be monitored to identify updates. A detailed description of how the updates to the operating system and other software are identified and installed is provided in the descriptions of FIGS. 5-7.

At operation 422, a unified single filesystem (e.g., union filesystem 320 of FIG. 3) namespace is presented to a user of a confidential virtual machine booted in operation 420 to interact with it. The unified single filesystem ensures the multiple volumes generated in operations 402 and 404 and the contents they are populated in operation 410 and 412 are hidden from the user. Hiding multiple volumes allows a user to treat a confidential virtual machine with multiple volumes as a traditional virtual machine with no special volumes to handle user-generated content separated from operating system binaries.

FIG. 5 depicts an example method 500 for updating a confidential virtual machine (e.g., confidential virtual machine 300 of FIG. 3).

At operation 502, updates available to be applied to an operating system image, such as the operating system image generated in method 400 (of FIG. 4), are analyzed to determine whether to apply the updates to the operating system. Operating system updates may be analyzed by a client update orchestrator, which is part of a confidential virtual machine running the operating system. Update session orchestrator 112 (as shown in FIG. 1) running on computing device 102 (as shown in FIG. 1), which also hosts a confidential virtual machine, may work with the client update orchestrator. The client update orchestrator may contact update server 108 to identify updates to the operating system running on a confidential virtual machine. In some examples, an update server may be a software agent running on a remote server.

At operation 504, an update of operating system binaries that form the operating system image generated in method 400 is identified by a host (e.g., computing device 102 of FIG. 1) of a confidential virtual machine running the operating system. The client update orchestrator of a confidential virtual machine (e.g., confidential virtual machine 300 of FIG. 3) may request to download an operating system update identified in operation 502.

At operation 506, updates available to be applied to operating system binaries are validated to confirm the operating system binaries can be installed on a confidential virtual machine. The client update orchestrator may validate the operating system update by verifying that the signature of the operating system update matches the signature provided by the update server. For example, virtual machine manager 110 (of FIG. 1) generates a read-only volume to use with a confidential virtual machine. The signature verification is generated by calculating the checksum of the operating system update and comparing it to the checksum representing the signature provided by the update server.

At operation 508, updates of operating system binaries are merged and installed to generate a new operating system image. Client update orchestrator of the confidential virtual machine may engage with servicing stack 114 (as shown FIG. 1) to install operating system updates. As part of the installation of an update, all operating system binaries (e.g., CIMS 324 of FIG. 3) used in the current version of the operating system running on a confidential virtual machine is created. Each of the inventoried operating system binaries forms partial images of a composite filesystem and is merged with updated operating system binaries to generate a new operating system image.

At operation 510, updates to operating system binaries are finalized by mounting the new operating system image generated in operation 510. Boot configuration may be updated as part of mounting the new operating system image. In some examples, servicing stack 114 (as shown in FIG. 1) updates boot configuration and mounts the new operating system image. In some examples, after operation 512, method 500 proceeds to method 600 of FIG. 6. The operations of method 600 include further processing to handle updates to operating system binaries.

At operation 512, the confidential virtual machine is rebooted to load the mounted operating system image. Servicing stack 114 may perform the reboot operation. In some examples, any updates to drivers, including operating system software, is staged for update during the reboot operation. The staged update of a driver causes the latest versions of any drivers to be downloaded and included in a confidential virtual machine, for example in driver store 326 (as shown in FIG. 3). In some examples, the operating system generated after further processing by method 600 is loaded in operation 514 during the reboot of a confidential virtual machine.

At operation 514, the result of updates to the operating system is transmitted after booting into the new operating system. The client update orchestrator in a confidential virtual machine (e.g., confidential virtual machine 300 of FIG. 1) may query servicing stack 114 for the result of the update operation. The result is communicated to a user or management software running on a computing device (e.g., computing device 102 of FIG. 1) and monitoring a confidential virtual machine.

At operation 516, a cleanup operation is performed. Cleanup operation includes deleting the previous version of the operating system. In some examples, the client update orchestrator calls servicing stack 114 to delete the previous operating system. The cleanup operation also includes unmounting the previous operating system from a read-only volume (e.g., RO volume 302 of FIG. 3). In some examples, the client update orchestrator calls the host update orchestrator to unmount the previous operating system.

In some examples, the cleanup operation includes receiving requests from a user of system 100 (of FIG. 1). User requests may include uninstallation of the update performed in operations 502 to 516. In some examples, users request uninstallation of portions of the updates to the operating system. An uninstallation request results in an update to the boot configuration to mount the previous operating system on the next boot. Servicing stack 114 may help update the boot configuration to load the previous operating system.

Figure 6:
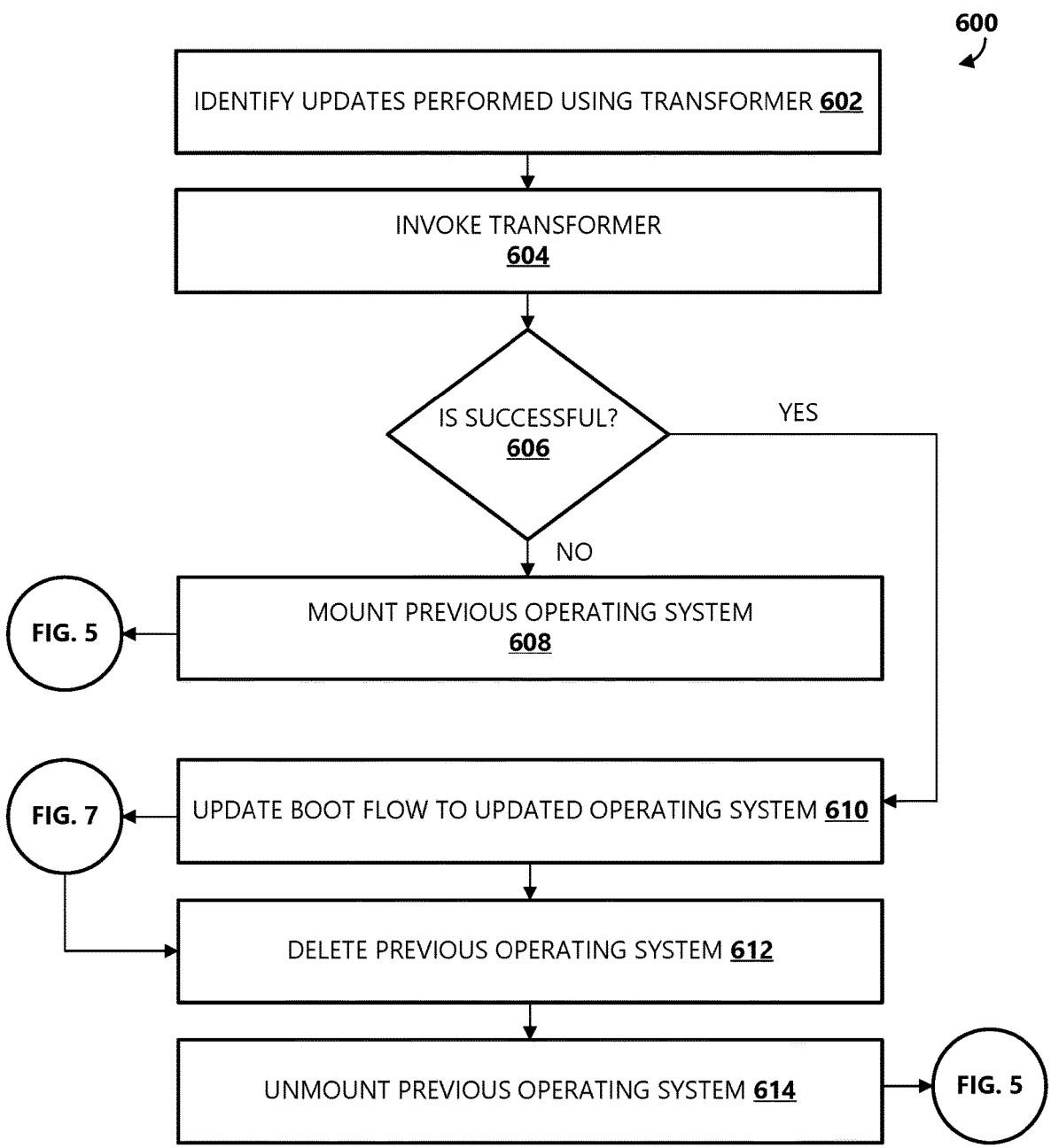
FIG. 6 depicts an example method for executing transformers on confidential virtual machine.

FIG. 6 depicts an example method for executing transformers to update the software running on a confidential virtual machine (e.g., confidential virtual machine 300 of FIG. 3).

At operation 602, updates to the software running on a confidential virtual machine that requires a transformer (e.g., transformers 322 of FIG. 3) are identified based on changes to a schema or layout of the filesystem of the confidential virtual machine.

At operation 604, a transformer is invoked to update the software on a confidential virtual machine. To invoke and run the transformer, the boot flow of a confidential virtual machine is updated to load from a specialized secondary update operating system that is different from the primary operating system which includes the merged operating system binaries. The boot flow of a confidential virtual machine represents the order in which a set of software is loaded as part of booting a confidential virtual machine. The boot flow also includes pointers to software and firms to be loaded as part of the boot process. In some examples, servicing stack 114 (as shown in FIG. 1) changes boot flow to boot into the secondary update operating system. When a confidential virtual machine boots into the secondary update operating system, servicing stack 114, which is running during the boot, invokes the transformer.

At operation 606, a check is performed on the result of the execution of the transformer. If the result indicates a successful transformation to update the schema/layout of the filesystem as part of a software update on a confidential virtual machine, the method proceeds to operation 610. Otherwise, the method continues to operation 608.

At operation 608, the updates performed by a transformer are rolled back (e.g., removed) by updating the boot configuration to mount the previous operating system on the next boot. In some examples, servicing stack 114 updates the boot configuration. The operation also includes invoking transformers, other installers, and commands to signal rollback and initiate a reboot of a confidential virtual machine.

After operation 608, method 600 proceeds to operation 514 of FIG. 5, where a confidential virtual machine is rebooted to load the previous operating system identified in operation 608.

At operation 610, the boot flow of the confidential virtual machine is updated to include an updated operating system. In some examples, servicing stack 114 runs during reboot to invoke and finalize updates of driver software. Servicing stack 114 may also invoke advanced installers and generic commands to finalize the installation of other optional software components to run on a confidential virtual machine.

In some examples, method 600 proceeds after operation 610 to perform operations of method 700, as presented in the FIG. 7 description below. The operations of method 700 include further processing to handle updates to software running on a confidential virtual machine.

At operation 612, the previous operation system is deleted. In some examples, the client update orchestrator of a confidential virtual machines calls servicing stack 114 to delete the previous operating system.

At operation 614, the previous operating system is unmounted from a read-only volume (e.g., RO volume 302 of FIG. 3). In some examples, client update orchestrator calls the host update orchestrator running on a host of a confidential virtual machine (e.g., computing device 102 of FIG. 1) to unmount the previous operating system.

After operation 614, method 600 proceeds to operation 514 of FIG. 5, where the confidential virtual machine is rebooted to load the operating system identified in operation 610. In some examples, the confidential virtual machine is updated with an updated operating system mounted for reboot in operation 710 of FIG. 7.

Figure 7:
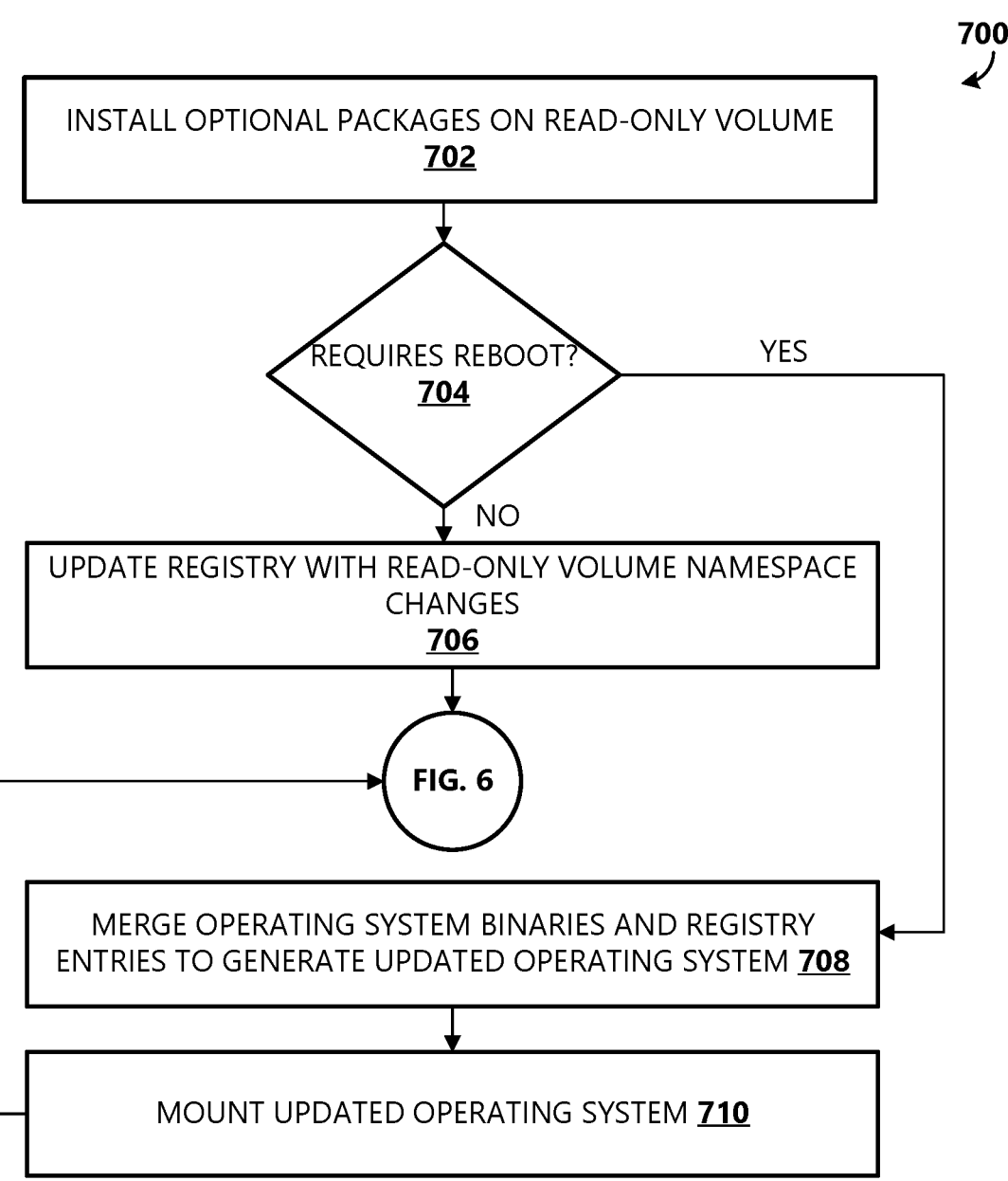
FIG. 7 depicts an example method for installing packages on confidential virtual machine.

FIG. 7 depicts an example method for installing packages on a confidential virtual machine (e.g., confidential virtual machine 300 of FIG. 3).

At operation 702, optional packages are installed on a read-only volume (e.g., RO volume 302 of FIG. 3). Optional packages may include language packages, on-demand features, and other optional features applicable to a confidential virtual machine. A user of a confidential virtual machine may request the installation of optional packages similar to the installation of such packages on a regular computing device running the same operating system as the confidential virtual machine.

At operation 704, a check is performed to determine whether a reboot of a confidential virtual machine is required. The check is performed based on the packages identified for installation in operation 702. If a reboot is required, then method 700 proceeds to operation 708. Otherwise, method 700 continues to operation 706. For example, if the optional packages identified and installed in operation 702 depend on files in use in confidential virtual machine, then confidential virtual machine is rebooted.

At operation 706, a registry (e.g., registry 318 of FIG. 3) is updated with changes made to the read-only volume of a confidential virtual machine. Method 700 then proceeds to operation 612 of FIG. 6.

At operation 708, operating system binaries and registry entries are merged to form an updated operating system.

Servicing stack 114 generates an updated operating system by merging operating system binaries and the registry.

At operation 710, the updated operating system from operation 708 in mounted to include in a boot flow of the confidential virtual machine. Operation 710 additionally includes performing boot configuration to load the updated operating system during the next boot of a confidential virtual machine. In some examples, service stack 114 changes the boot configuration.

After operation 710, method 700 proceeds to operation 612 of FIG. 6, where the previous operating system is deleted. In some examples, returning to method 500 depicted in FIG. 5, at operation 514, the confidential virtual machine is then updated with an updated operating system mounted for reboot in operation 710.

FIG. 8 is a block diagram illustrating physical components (e.g., hardware) of a computing device 800 with which examples of the present disclosure may be practiced. The computing device components described below may be suitable for one or more of the components of the systems described above. In a basic configuration, the computing device 800 includes at least one processing unit 802 and a system memory 804. Depending on the configuration and type of computing device 800, the system memory 804 may comprise volatile storage (e.g., random access memory), non-volatile storage (e.g., read-only memory), flash memory, or any combination of such memories. The system memory 804 may include an operating system 805 and one or more program modules 806 suitable for running software applications 850 (e.g., virtual machine manager 110, update session orchestrator 112, servicing stack 114) and other applications.

The operating system 805 may be suitable for controlling the operation of the computing device 800. Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, or optical disks. Such additional storage is illustrated in FIG. 8 by a removable storage device 809 and a non-removable storage device 810.

As stated above, a number of program modules and data files may be stored in the system memory 804. While executing on the processing unit 802, the program modules 806 may perform processes including one or more of the stages of the methods 400, 500, 600, and 700, illustrated in FIGS. 4-7. Other program modules that may be used in accordance with examples of the present disclosure and may include applications such as search engines and database applications, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 800 on the single integrated circuit (chip). Examples of the present disclosure may also be practiced using other technologies capable of performing logical operations such as, for example, AND, OR, and NOT, including mechanical, optical, fluidic, and quantum technologies.

The computing device 800 may also have one or more input device(s) 812 such as a keyboard, a mouse, a pen, a sound input device, a touch input device, a camera, etc. The output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include radio frequency (RF) transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 804, the removable storage device 809, and the non-removable storage device 810 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer readable media may be part of the computing device 800. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to a system for setting up confidential virtual machine. The system includes at least one processor, and a memory coupled to the data center orchestrator, the memory consisting of computer executable instructions that, when executed by the data center orchestrator, to perform operations. The operations include: determining a current state of a read-only volume by accessing a first root of a first hash tree, the first hash tree stores a history of a state of the read-only volume, determining a current state of a read-write volume by accessing a second root of a second hash tree, the second hash tree stores a history of a state of the read-write volume, validating the operating system binaries in the current state of the read-only volume, validating the user-generated content in the current state of the read-write volume, merging the operating system binaries and the user-generated content to generate an image of the operating system associated with the confidential virtual machine, and merging a first namespace of the read-only volume and a second namespace of the read-write volume into a unified single filesystem namespace.

In an example, the operations performed by the processor further comprise: identifying an update to the operating system, wherein the update includes an updated operating system binary of the operating system binaries stored on the read-only volume, and storing the update to the read-write volume as the user-generated content. In another example, the operations further comprise: accessing the update stored in the read-write volume, validating the update of the operating system binaries by matching a signature provided along with the update and a signature associated with the read-write volume, merging the one or more system binaries in the read-only volume with the update operating system binary in the read-write volume to generate an updated operating system, generating an image of the updated operating system, mounting the image of the updated operating system on the read-only volume, and rebooting the confidential virtual machine to load the updated operating system. In still another example, identifying an update to the operating system further comprises: contacting an update server to request a download of the updated operating system. In a further example, rebooting the confidential virtual machine to load the updated operating system further comprises: identifying updates performed using a transformer, wherein the transformer updates filesystem layout of the read-write volume, changing boot flow from loading the updated operating system to boot a minimal operating system to invoke the transformer, and changing the boot flow from the minimal operating system to boot the updated operating system. In a still further example, changing the boot flow for loading the updated operating system to boot a minimal operating system to invoke the transformer further comprises: based on an output of the transformer, rolling back the update to the operating system, the operations comprise: mounting the operating system on the read-only volume, and rebooting the confidential virtual machine to load the operating system. In yet another example, changing the boot flow from the minimal operating system to boot the updated operating system further comprises: transmitting a result of loading the updated operating system, and deleting the operating system. In still yet another example, identifying an update to the operating system further comprises: installing an optional package present on the read-only volume, and updating a registry to include changes to the second namespace of the read-only volume. In another example, merging the operating system binaries and registry entries to generate a second updated operating system associated with the confidential virtual machine, and rebooting the confidential virtual machine to load the second updated operating system.

In an example, the operations performed by the processor further comprise: booting the confidential virtual machine to load the image of the operating system, and presenting the unified single filesystem namespace for interacting with the confidential virtual machine, wherein filesystem namespaces of the read-only volume and the read-write volume are concealed during the presenting.

In an example, hash value of the first root of the first hash tree includes a unique identifier identifying the read-only volume.

In an example, hash value of the first root of the first hash tree includes value of a monotonically increasing virtual clock.

In an example, generating the read-write volume to store the user-generated content includes encrypting the read-write volume.

In an example, the operations performed by the processor further comprise: generating a registry to manage metadata of the operating system, and overlaying the registry on the read-only volume and the read-write volume.

In an example, the operations performed by the processor further comprise: storing the hash values of the first root of the first hash tree and the second root of the second hash tree in a storage further comprises: storing the first root in a first location that is accessible by unlocking the first location, and storing the second root in a second location different from the first location.

In another aspect, the technology related to a computer-implemented method for setting up a confidential virtual machine. The method includes generating a read-only volume to store operating system binaries on a first filesystem indexed using a first hash tree, generating a read-write volume to store user-generated content on a second filesystem indexed using a second hash tree, storing hash values of a first root of the first hash tree and a second root of the second hash tree in a storage accessed as part of loading the operating system binaries, instantiating the confidential virtual machine by: accessing the first root of the first hash tree to determine a current state of the read-only volume, accessing the second root of the second hash tree to determine the current state of the read-write volume, verifying the system binaries in the current state of the read-only volume, verifying the user-generated content in the current state of the read-write volume, merging the operating system binaries and the user-generated content to generate an image of a first operating system image associated with the confidential virtual machine, and merging a first namespace of the read-only volume and a second namespace of the read-write volume into a unified single filesystem namespace.

In an example, the method further includes booting the confidential virtual machine to load the image of the operating system, and presenting the unified single filesystem namespace for interacting with the confidential virtual machine, wherein filesystem namespaces of the read-only volume and the read-write volume are concealed during the presenting.

In an aspect, the technology relates to a system for setting up confidential virtual machine. The system includes at least one processor, and a memory coupled to the data center orchestrator, the memory consisting of computer executable instructions that, when executed by the data center orchestrator, to perform operations. The operations include: identifying operating system binaries to include in an operating system of a confidential virtual machine on a read-only volume, identifying user-generated content to include in the operating system of the confidential virtual machine on a read-write volume, identifying an update to the operating system, wherein the update includes updates to the operating system binaries, merging the operating system binaries, the user-generated content, the update to the operating system to generate an image of an updated operating system associated with the confidential virtual machine, and merging a first namespace of the read-only volume and a second namespace of the read-write volume into a single filesystem namespace.

In an example, identifying the update to the operating system further comprises: storing the update in the read-write volume as the user-generated content.

In an example, identifying the update in the operating system further comprises: storing the update in the read-only volume as part of the operating system binaries.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system comprising:
a processor unit; and

23 memory coupled to the processing unit, the memory comprising computer executable instructions that, when executed, perform operations comprising:

determining a current state of a read-only volume by accessing a first root of a first hash tree, wherein the first hash tree stores a history of a state of the read-only volume;

determining a current state of a read-write volume by accessing a second root of a second hash tree, wherein the second hash tree stores a history of a state of the read-write volume;

validating operating system binaries in the current state of the read-only volume;

validating user-generated content in the current state of the read-write volume;

merging the operating system binaries and the user-generated content to generate an image of an operating system associated with a confidential virtual machine; and merging a first namespace of the read-only volume and a second namespace of the read-write volume into a unified single filesystem namespace.

2. The system of claim 1, wherein the operations further comprise:

identifying an update to the operating system, wherein the update includes an updated operating system binary of the operating system binaries stored on the read-only volume; and storing the update to the read-write volume as the user-generated content.

3. The system of claim 2, the operations further comprise:

accessing the update stored in the read-write volume;

validating the update of the operating system binaries by matching a signature provided along with the update and a signature associated with the read-write volume;

merging the one or more system binaries in the read-only volume with the update operating system binary in the read-write volume to generate an updated operating system;

generating an image of the updated operating system;

mounting the image of the updated operating system on the read-only volume; and rebooting the confidential virtual machine to load the updated operating system.

4. The system of claim 2, wherein identifying an update to the operating system further comprises:

contacting an update server to request a download of the updated operating system.

5. The system of claim 3, wherein rebooting the confidential virtual machine to load the updated operating system further comprises:

identifying updates performed using a transformer, wherein the transformer updates filesystem layout of the read-write volume;

changing boot flow from loading the updated operating system to boot a minimal operating system to invoke the transformer; and changing the boot flow from the minimal operating system to boot the updated operating system.

6. The system of claim 5, wherein changing the boot flow for loading the updated operating system to boot a minimal operating system to invoke the transformer further comprises:

based on an output of the transformer, rolling back the update to the operating system, wherein the operations comprise:

mounting the operating system on the read-only volume; and rebooting the confidential virtual machine to load the operating system.

7. The system of claim 5, wherein changing the boot flow from the minimal operating system to boot the updated operating system further comprises:

transmitting a result of loading the updated operating system; and deleting the operating system.

8. The system of claim 2, wherein identifying an update to the operating system further comprises:

installing an optional package present on the read-only volume; and updating a registry to include changes to the second namespace of the read-only volume.

9. The system of claim 8, wherein the operations further comprise:

merging the operating system binaries and registry entries to generate a second updated operating system associated with the confidential virtual machine; and rebooting the confidential virtual machine to load the second updated operating system.

10. The system of claim 1, wherein the operations further comprise:

booting the confidential virtual machine to load the image of the operating system; and presenting the unified single filesystem namespace for interacting with the confidential virtual machine, wherein filesystem namespaces of the read-only volume and the read-write volume are concealed during the presenting.

11. The system of claim 1, wherein a hash value of the first root of the first hash tree includes a unique identifier identifying the read-only volume.

12. The system of claim 1, wherein a hash value of the first root of the first hash tree includes value of a monotonically increasing virtual clock.

13. The system of claim 1, wherein generating the read-write volume to store the user-generated content includes encrypting the read-write volume.

14. The system of claim 1, wherein operations further comprise:

generating a registry to manage metadata of the operating system; and overlaying the registry on the read-only volume and the read-write volume.

15. The system of claim 1, wherein storing hash values of the first root of the first hash tree and the second root of the second hash tree in a storage further comprises:

storing the first root in a first location that is accessible by unlocking the first location; and storing the second root in a second location different from the first location.

16. A computer-implemented method for setting up a confidential virtual machine, the method comprising:

generating a read-only volume to store operating system binaries on a first filesystem indexed using a first hash tree;

generating a read-write volume to store user-generated content on a second filesystem indexed using a second hash tree;

storing hash values of a first root of the first hash tree and a second root of the second hash tree in a storage accessed as part of loading the operating system binaries;

instantiating the confidential virtual machine by:

accessing the first root of the first hash tree to determine a current state of the read-only volume;

accessing the second root of the second hash tree to determine the current state of the read-write volume;

verifying the operating system binaries in the current state of the read-only volume;

verifying the user-generated content in the current state of the read-write volume;

merging the operating system binaries and the user-generated content to generate an image of a first operating system image associated with the confidential virtual machine; and merging a first namespace of the read-only volume and a second namespace of the read-write volume into a unified single filesystem namespace.

17. The computer implemented method of claim 16, wherein the method further comprises:

booting the confidential virtual machine to load the image of an operating system; and presenting the unified single filesystem namespace for interacting with the confidential virtual machine, wherein filesystem namespaces of the read-only volume and the read-write volume are concealed during the presenting.

18. A system comprising:

a processing unit; and memory coupled to the processing unit, the memory comprising computer executable instructions that, when executed perform operations comprising:

identifying operating system binaries to include in an operating system of a confidential virtual machine on a read-only volume;

identifying user-generated content to include in the operating system of the confidential virtual machine on a read-write volume;

identifying an update to the operating system, wherein the update includes updates to the operating system binaries;

merging the operating system binaries, the user-generated content, the update to the operating system to generate an image of an updated operating system associated with the confidential virtual machine; and merging a first namespace of the read-only volume and a second namespace of the read-write volume into a single filesystem namespace.

19. The system of claim 18, wherein identifying the update to the operating system further comprises:

storing the update in the read-write volume as the user-generated content.

20. The system of claim 18, wherein identifying the update to the operating system further comprises:

storing the update in the read-only volume as part of the operating system binaries.

*  *  *  *  *